United States Patent [19]

McCall et al.

[11] Patent Number: 5,315,489

[45] Date of Patent: May 24, 1994

[54] PRESSURE CLAMP FOR TELECOMMUNICATIONS CLOSURE

[75] Inventors: Mark McCall, San Jose; Donald Del Fava, San Carlos; Thomas Wong, Menlo Park; Lowell I. Koht, Foster City, all of Calif.

[73] Assignee: Raynet Corporation, Menlo Park, Calif.

[21] Appl. No.: 988,619

[22] Filed: Dec. 10, 1992

[51] Int. Cl.$^5$ .............................................. H05K 7/18
[52] U.S. Cl. .................................. 361/801; 361/752; 361/802; 361/823; 174/40 CC; 174/50; 174/65 R; 439/717
[58] Field of Search ............... 361/752, 796, 801, 802, 361/823, 803, 827; 174/40 CC, 50, 65, 60; 439/717

[56] References Cited

U.S. PATENT DOCUMENTS

| | | | |
|---|---|---|---|
| 3,557,299 | 1/1971 | Dienes | 174/38 |
| 4,097,683 | 6/1978 | Summers | 174/38 |
| 4,183,601 | 1/1980 | Barber et al. | 339/44 R |
| 4,725,921 | 2/1988 | Scholz | 361/392 |
| 5,069,516 | 12/1991 | Kohy et al. | 350/96.1 |

FOREIGN PATENT DOCUMENTS

US90/06846 11/1990 PCT Int'l Appl. .

Primary Examiner—Leo P. Picard
Assistant Examiner—Young Whang
Attorney, Agent, or Firm—Herbert G. Burkard

[57] ABSTRACT

A telecommunications closure (1) includes a pressure clamp (21) for sealingly clamping mating parts (47, 48) of the closure together so as to form a water tight seal. The clamp member requires no tools during installation and creates no uncertainty as to the generation of appropriate clamp pressure on a sealing O-ring when installed. The pressure clamp includes an over-center latch which is rotatable between a first unlatched position and a second latched position, a clamping pressure generated by the latch increasing to a maximum value as the rotatable latch is moved from its first position to an intermediate position between the first and second positions and then decreases from this maximum value as the latch is moved from the intermediate position to the second position so as to generate a predetermined appropriate clamping pressure when in its second position so as to appropriately compress the O-ring disposed within a groove between the closure parts at their mating area.

12 Claims, 5 Drawing Sheets

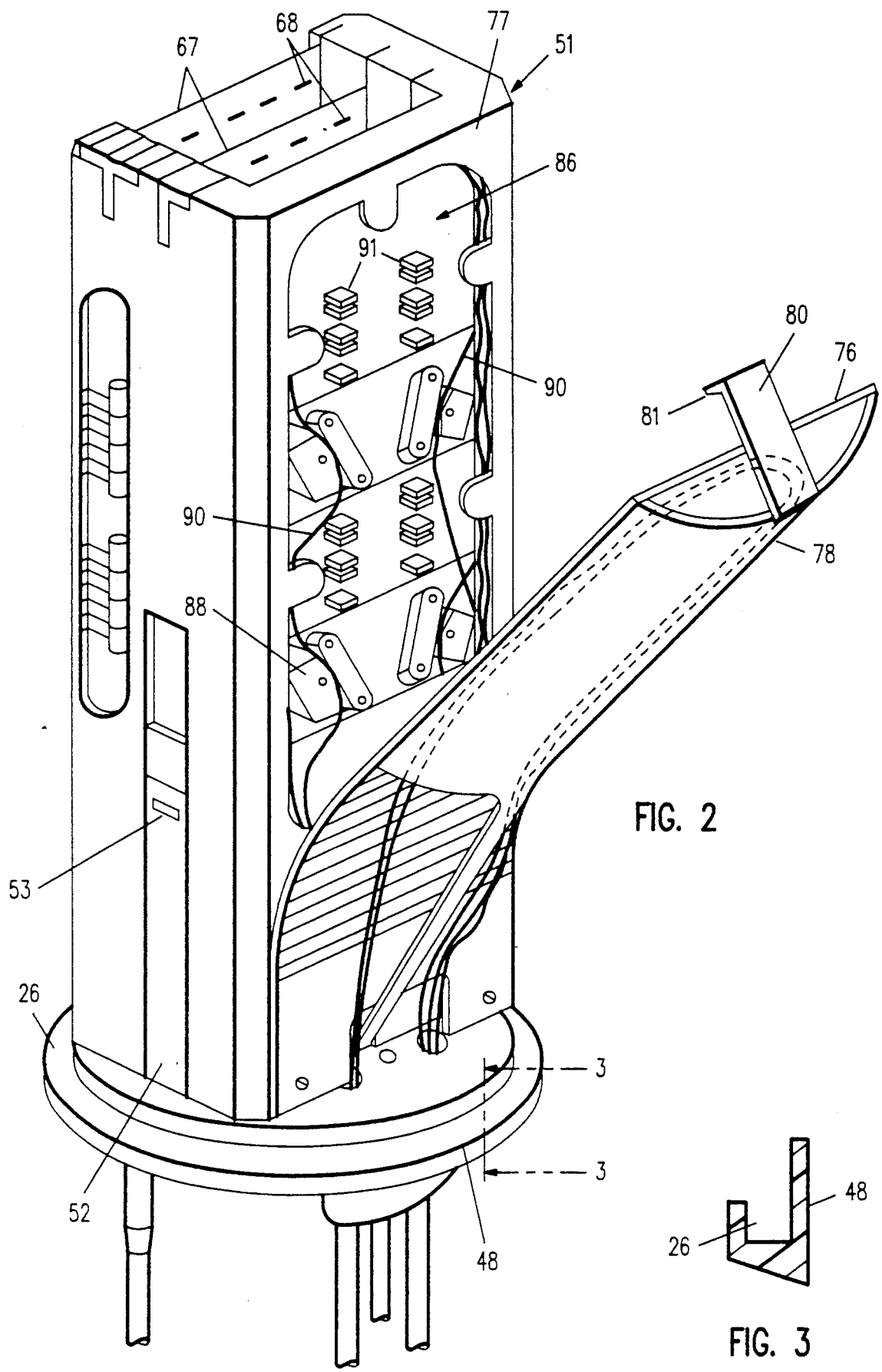

PRESSURE CLAMP FOR TELECOMMUNICATIONS CLOSURE

BACKGROUND OF THE INVENTION

1. Field of the Invention

The present application is directed to a pressure clamp for a telecommunications closure, preferably a telecommunications closure which contains circuit cards and electronic components thereon such as microprocessors, and also preferably includes either optical fiber or copper wire drops, or both.

2. Description of the Prior Art

Various closures have been proposed in the prior art for enclosing electronic components associated with optical fiber systems designed to delivery either voice, video, and/or data information to end users, the closures also typically including optical fiber and electrical twisted wire and sometimes electrical coaxial cables. It is essential that such closures be water tight so that deployment in underground environments will not allow water to come in contact with the optical fiber cable and electronic components, and water tight closures are also preferable in above-ground, i.e. pedestal, applications.

Prior art pressure clamps for clamping and creating a seal between first and second parts of a telecommunications closure utilize a nut and bolt arrangement whereby the clamp is tightened by torquing the nut to get an apparent mechanical advantage of the pitch of bolt threads to enable a clamp to be tightened without an inordinate amount of work by a craftsperson. Such prior art clamps are disadvantageous since they require tools, are not particularly user friendly, and there is a substantial amount of uncertainty when tightening the nut as to when sufficient clamp pressure has been generated so as to result in a water tight seal and also result in an arrangement whereby the pressure is still low enough to prevent mechanical parts of the clamp from being unduly stressed which can result in premature failure of the clamp. Furthermore, prior art clamps are generally made of metal and hence are subject to corrosion, and are relatively expensive. Finally, prior art clamps generally utilize clamp legs which have an angled interior surface equal to or greater than 20° which slidingly engages a mating confronting surface of the closure parts. Though such large angles result in requiring minimum movement of the clamp when tightening the nut to generate sufficient clamp pressure, such large angles are disadvantageous since in low temperature conditions the closure parts tend to contract radially creating a significant possibility that pat of the seal generated by the clamp may be broken on a side of the clamp from which the closure parts retract.

SUMMARY OF THE INVENTION

It is an object of the invention to eliminate the above-noted drawbacks of the prior art and to provide a pressure clamp for a telecommunications closure which is user friendly, requires no installation tools, creates no uncertainty as to when an appropriate amount of clamp pressure has been generated, and is relatively inexpensive.

These and other objects of the invention are achieved by a pressure clamp (21) for a telecommunications closure (1), comprising:

- a circumferential clamp member (22, 23) which encircles a sealing ring (25) disposed within a circumferential cavity (26) formed between mating parts (47, 48) of the telecommunications closure, the clamp member having first and second confronting ends (31, 32) which are separated in an unclamped state from one another, the clamp member having first and second legs (27, 28) extending radially inwardly around its circumference, an interior surface (29, 30) of the legs being shaped so as to be slideable over radially extending mating engagement surfaces (49, 50) of the closure parts;
- means (24) for urging and latching the first and second confronting ends together so as to urge the clamp member legs over the engagement surfaces to maintain compression on the sealing ring to provide a pressure seal between the closure mating parts;
- the urging and latching means including an over-center rotatable latch (38) rotatably moveable between a first open unlatched position and a second latched position, an attractive force exerted between the first and second clamp member confronting ends increasing to a maximum as the rotatable latch is moved from its first position to an intermediate position between the first and second positions and then decreasing from the maximum as the latch is moved from the intermediate position to the second position.

The invention will be further understood by reference to the drawings and detailed description.

BRIEF DESCRIPTION OF THE DRAWING(S)

FIG. 2 illustrates a card cage optimally disposed within the telecommunications closure of FIG. 1.

FIG. 3 illustrates a partial cross-sectional view of a closure cavity formed by one of the mating parts of the closure of FIG. 2, taken along lines III—III in FIG. 2.

DESCRIPTION OF THE PREFERRED EMBODIMENTS

FIGS. 4-10 illustrate various features of a preferred embodiment of a pressure clamp 21 according to the present invention, the pressure clamp being preferably suitable for creating a pressure tight seal for a telecommunications closure 1 (FIG. 1) of the type disclosed in U.S. Pat. No. 5,069,516 and U.S. patent application Ser. No. 07/439,898 filed Nov. 21, 1989 which is equivalent to PCT/US90/06846, both assigned to the assignee of the invention, the disclosures of which are incorporated herein by reference.

Figure 1:
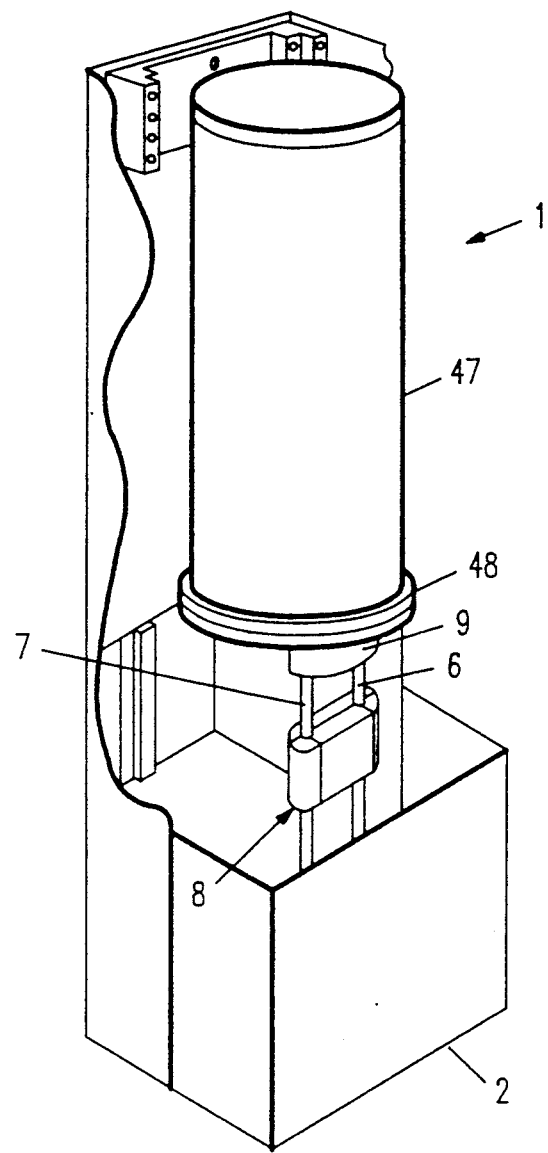
FIG. 1 illustrates a telecommunications closure disposed in a pedestal for which a clamp of the invention is suitable.

Referring to FIG. 1, the closure 1 is disposed in a pedestal 2, designed for above ground deployment, with the closure 1 having first and second mating parts 47, 48 which are disengageable so as to provide craft access to an interior of the closure. In the embodiment illustrated, reference numeral 47 comprises a substantially cylindrical dome which is engageable with a base plate 48. Optical fiber cables 6, 7 enter and exit the base plate and dome in a vicinity of cable seals 8 and 9.

Referring to FIG. 2, an interior of the closure 1 includes a card cage 51 having slots for accommodating a plurality of cards 67, the cards preferably being printed circuit boards having electrical circuits 68 thereon and optionally electrical/optical transducers. The electrical circuits optimally provide a variety of functions, in the case of optical fiber telecommunications systems, that of processing optical and electrical voice, data, and/or video signals, generating alarms and various signaling information, etc. Preferably, the card cage further includes a tray 86 having a plurality of attachment sections 91 into which splices or connectors can be retained, i.e. optical fiber splices and connectors, and optionally transducers for performing electrical-to-optical and optical-to-electrical conversions. In the embodiment shown, optical fiber 90 is disposed within couplers 81 of the noninvasive type which can extract and inject signals into and out of fiber through a side thereof, this feature of the invention being purely optional, i.e. standard end fiber terminations could also be utilized as well using connectors. FIG. 2 further illustrates a bypass fiber storage tray 76 deflectable from and connectable to an upper part 77 of the card cage by an attaching member 80 having a hooked end 81. Optical fiber which is not being coupled within the closure 1 can be routed around and stored on the tray 76. Reference numeral 78 is an outer cover which provides additional environmental protection for the optical fibers on this storage tray. Reference numerals 52 and 53 illustrate spring clamps for attaching the card cage 51 to the base plate 48.

Figure 4:
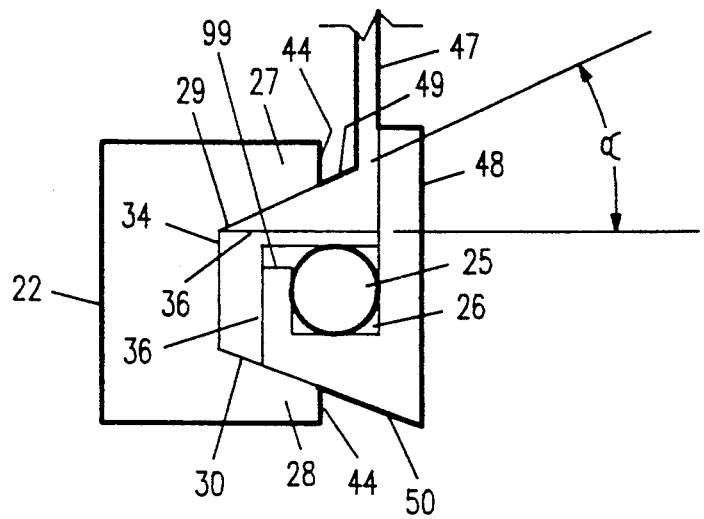
FIG. 4 is a detailed side view of first and second mating closure parts with a sealing O-ring therebetween being partially clamped by a section of the clamp of the invention.

Reference numeral 26 in FIG. 2 illustrates a circumferential cavity formed on an upper surface of an outer parameter of the base plate 48, as more clearly illustrated in FIG. 3. FIG. 4 illustrates an orientation of the base plate 48 when it is mated with the telecommunications closure dome 47 prior to it being clamped thereby by a portion 22 of the pressure clamp 21 according to the invention. As illustrated in the figure, a circumferential O-ring 25 is disposed within the cavity 26.

Figure 5:
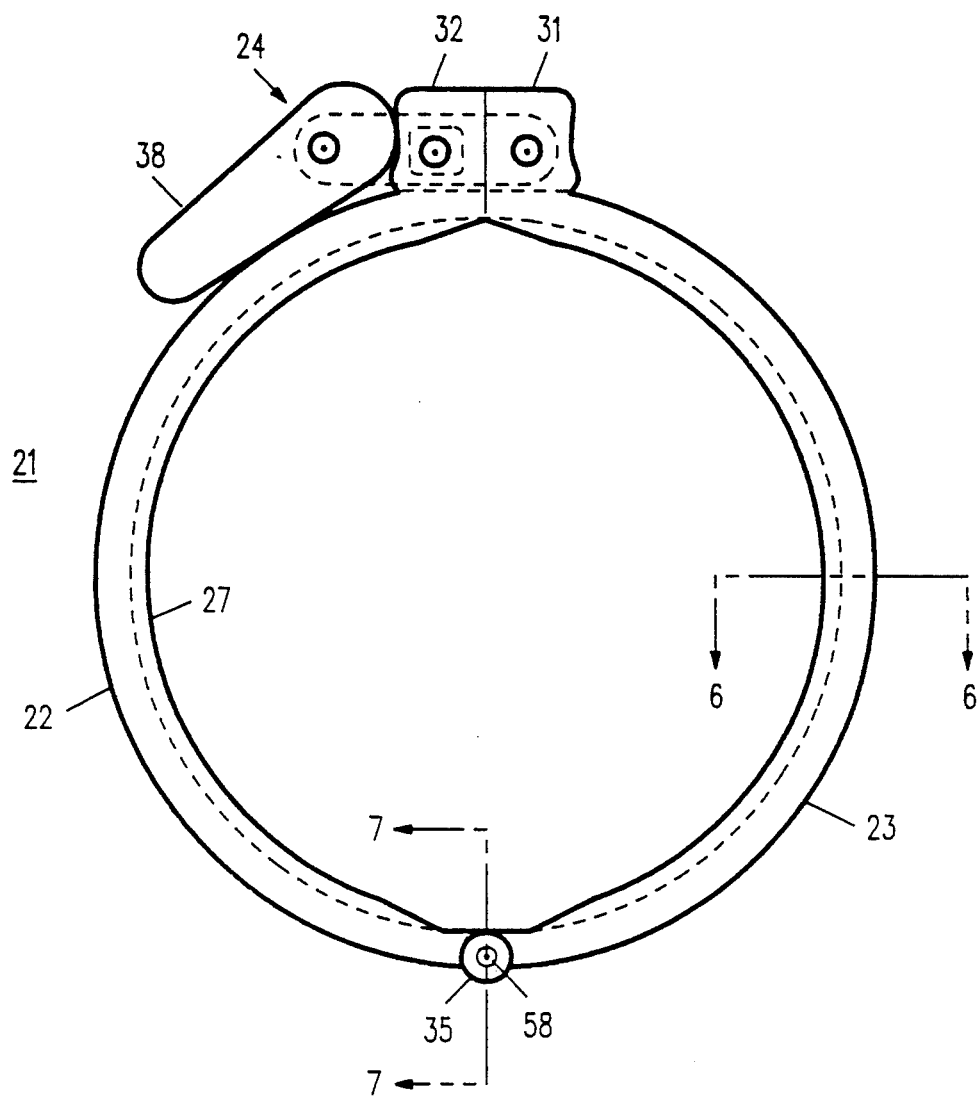
FIG. 5 is a top view of a clamp according to the invention.
Figure 6:
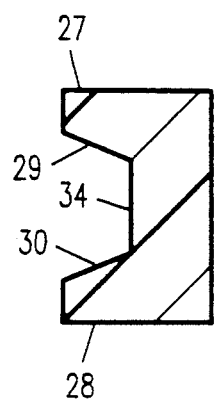
FIG. 6 is a cross-sectional view taken along lines VI-VI in FIG. 5.

FIG. 5 illustrates a top view of the clamp 21 which, in use, is disposed circumferentially around the closure parts 47, 48 in an area where they mate such that legs 27, 28 of the pressure clamp extend radially inwardly and are slideable over outwardly extending radial mating engagement surfaces 49, 50 of the closure parts 47, 48, as best illustrated in FIG. 4. As this figure illustrates, the interior surfaces 29, 30 of the legs have a shape which is complementary to and matches a shape of the mating engagement surfaces 49, 50.

Figure 8:
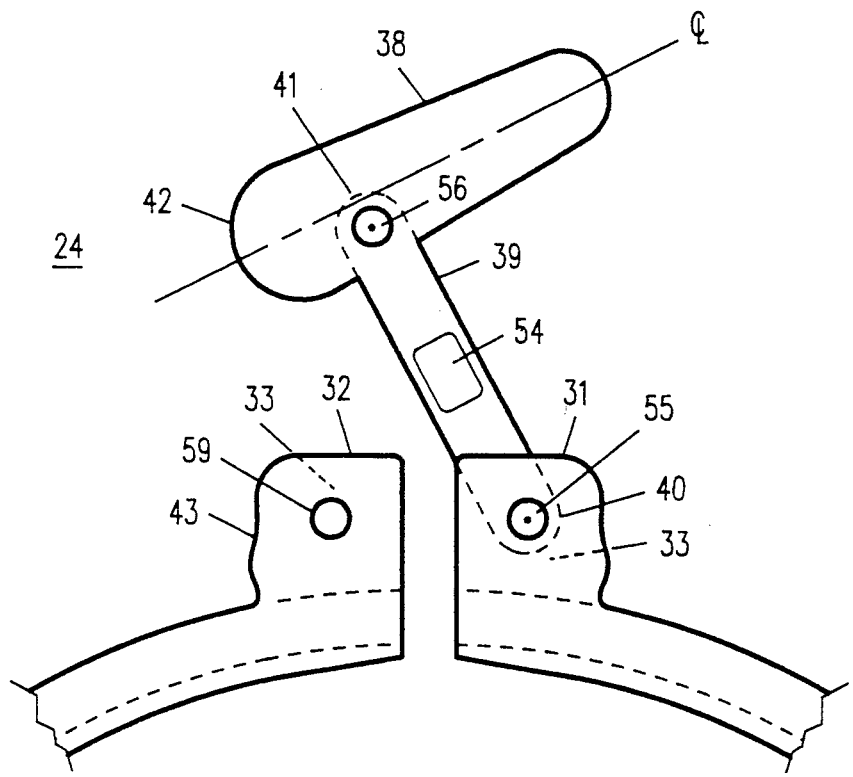
FIGS. 8-10 are enlarged views of clamp urging and latching means illustrated in FIG. 4, with FIG. 8 showing the clamp latch in its first unlatched position and FIG. 10 showing the clamp latch in its second latched position.

FIG. 8 illustrates details of a clamp lock 24 illustrated in FIG. 5, with the clamp lock 24 in FIG. 8 being in its open first position whereat first and second ends 31, 32 of the clamp member are separated a predetermined distance. When the ends 31, 32 are so separated, the first and second clamp legs 27, 28 are slideably engaged with the mating engaging surfaces 49, 50, and a base 34 of a channel formed by the legs 27, 28 is separated from an outer circumferential surface 36 of the closure mating parts 47, 48 a predetermined amount. As will be appreciated by those having ordinary skill in the art, urging the clamp member confronting ends 31, 32 together by the structure constructed according to the present invention will cause the diameter of the pressure clamp 21 to decrease and hence urge the channel base 34 radially inwards and towards the outer circumferential surfaces 36 of the closure parts 47, 48. Doing so results in transverse forces being imposed on the closure part 47 in the downward direction and on the closure part 48 in the upward direction in FIG. 4 so as to compress the O-ring 25 and create a pressure seal between the closure parts 47, 48. Preferably, the pressure clamp and closure parts are dimensioned so that an optimum transverse clamping pressure is maintained on the O-ring 25 when the clamp lock 24 is latched in its second closed position, shown in FIGS. 5, 10. Optimally, in this position, the channel base 34 and outer circumferential surfaces 36 are in contact all the way around the closure parts 47, 48, with surfaces 44 of the pressure clamp members 22, 23 being spaced from the closure parts so as to not impose any undue loads on the clamp member legs 27, 28. Accordingly, the pressure clamp can be made of a plastic material as can the closure parts, rather than metal, and yet generate sufficient hoop forces and forces transverse to these hoop forces so as to maintain a water tight pressure seal. Experiments have shown that an interior pressure of 5 psi within the closure can be maintained over temperature cycling between $-40°$ C. and $+65°$ C. when the clamp member is constructed of filled polyester having a glass filling of approximately 20% (i.e. polybutylene teraphalate), with the closure parts being made of polypropylene using an O-ring made of ethylene polypropylene, 60 shore hardness, sized to create a gap of about 40/1000 of an inch between surfaces 99 of the closure parts prior to exerting sealing pressure on the pressure clamp. Optimally, when the clamp lock is in its second position, the closure part surfaces 99 are in contact with one another. According to a preferred embodiment, the clamp member can have various percentages of glass fillings, i.e. 5%-50%, preferably 10%-25%, i.e. 20%.

According to a preferred embodiment, an angle $\alpha$ which the clamp legs 27, 28 each make with a diameter of the closure parts should be kept relatively small, i.e. less than 20%, to minimize transverse loads imposed along a direction perpendicular to the closure parts diameter as the closure parts expand and contract during temperature cycling. The angle $\alpha$ can be as low as 0°, though according to a preferred embodiment a small angle $\alpha$ is preferred to make the pressure clamp more user friendly since without any angle initial transverse pressure must be imposed on the closure parts 47, 48 manually to initially compress the O-ring 25 to allow the clamp legs 27, 28 to be disposed over surfaces 49, 50. With a small taper angle, lead-in of the legs over the surfaces 49, 50 is easily facilitated by hand with no transverse external pressure being required, with all transverse pressure during the clamping operation then being conveniently applied via hoop forces generated by the clamp lock 24 whose construction details will be explained further. Preferably, the angle $\alpha$ is between 0° and 20°, more preferably between 4° and 16°, even more preferably between 4° and 14°, yet more preferably between 4° and 10°, and optimally between 5° and 8°, e.g. 7°. A 7° angle has been shown to generate sustainable transverse forces on the clamp legs during temperature cycling.

Figure 7:
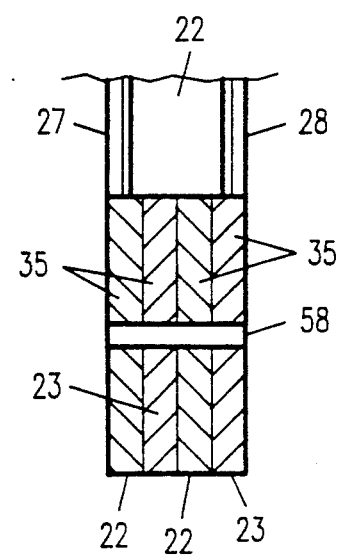
FIG. 7 is a cross-sectional view taken along lines VII—VII in FIG. 5.

According to a preferred embodiment, the pressure clamp includes first and second semicircular clamp members 22, 23 which are identical in construction except that ends 85 where the clamp members are to be connected are complementary in shape so as to allow a slide fit connection via a pin 58, as illustrated in FIG. 7. According to a preferred embodiment, all pins 55-58 utilized according to the invention are press fit pins which generate press fit retaining friction over a minimum surface area thereof so as to allow members connected by the pins to be rotatable utilizing minimum hand force.

Figure 9:
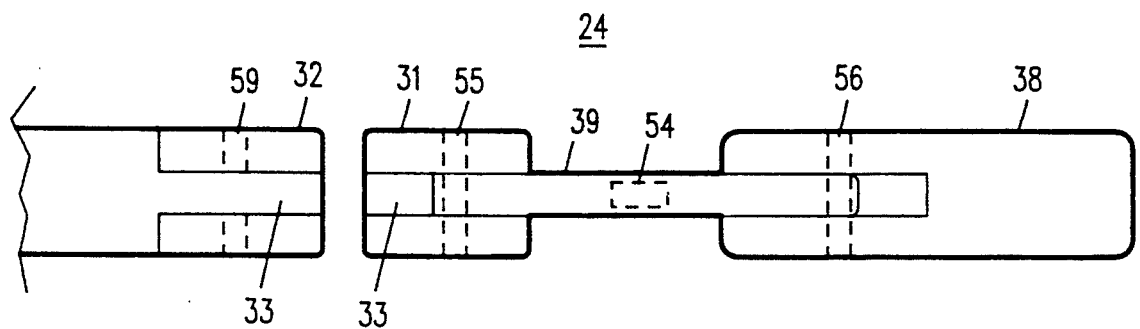
Figure 10:
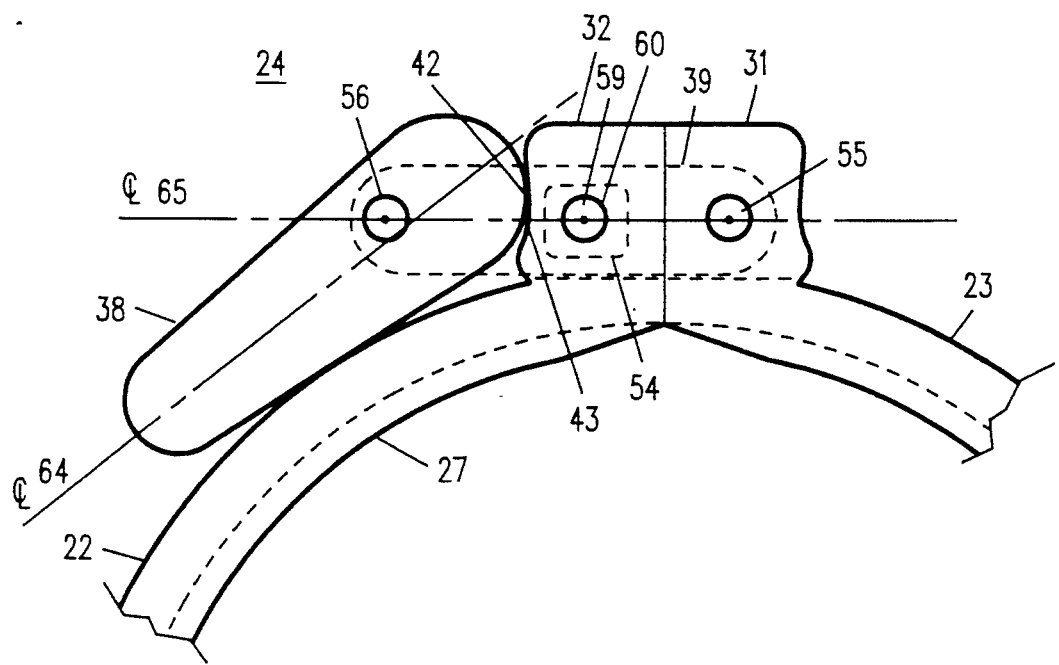

FIG. 9 is a side view of the clamp lock 24. FIGS. 5 and 10 show the clamp lock in its second closed position and in FIG. 8 in its first open position. The clamp lock 24 includes a rod 39 having a first end 40 connected to the first confronting end 31 via a press fit pin 55, the rod being slideable into and out of a longitudinal channel 33 formed within the clamp member confronting ends 31, 32. A second end 41 of the rod is connected to an over-center rotatable latch 38 via another press fit pin 56. The rod further includes a hole 54 which aligns with a further pin hole 59 on the clamp member second confronting end 32 (FIG. 10) when the over-center rotatable latch 38 is in its second latched position. Accordingly, if desired, a craftsperson can place a further press fit locking pin 60 into the hole 59 and through the rod hole 54 to prevent anyone or any vibration from accidentally opening the latch and hence releasing pressure on the pressure clamp and on the O-ring seal.

The latch 38 has an end 42 which can easily frictionally engage outer side surface 43 of the clamp member second end 32, as illustrated in FIG. 8, during an initial closing operation of the pressure clamp. When the surfaces 42, 43 initially come in contact, upon further rotation of the latch 38, the ends 31, 32 are urged towards each other. Upon this initial engagement, since the pressure clamp 21 is only lightly engaged with the outer surfaces of the closure parts 47, 48, very little resistance is met in pulling the ends 31, 32 towards each other so little mechanical advantage is required for initially rotating the latch 38. As the latch is further rotated, the mechanical advantage generated increases as does the resistance generated by the pressure clamp 21. According to the invention, the attractive force generated between the ends 31, 32 reaches a maximum when a center line axis 64 of the latch is approximately parallel with a center line axis of the rod 39. Upon further rotation of the latch 38 towards its second position whereat it is adjacent to and in contact with the clamp member 22, the attractive force generated and exerted so as to attract the first and second ends 31, 32 decreases slightly thus ensuring that the second position of the latch is mechanically stable. Accordingly, "an overcenter rotatable latch" as used herein is intended to refer to a latch which during its latching operation first generates an attractive force between two members which steadily increases and reaches a maximum and then decreases a predetermined amount until the latch reaches its second final position thus ensuring that the latch will not accidentally be opened during vibration or other incidental loads.

Though FIG. 10 illustrates the ends 31, 32 in contact when the latch 38 is in its second closed and latched position, it should be appreciated by those skilled in the art that if desired by manufacturing tolerances a space can be provided between the ends 31, 32 when the latch 38 is in its final closed position. In addition, though a preferred embodiment of the invention is to form the pressure clamp 21 totally out of plastic parts to reduce costs, as well as the closure dome and base plate, these materials can be made of metal if desired or plastic materials other than those specified herein, the ultimate choice of materials being a mere design choice readily attainable by the ordinary skilled craftsperson.

According to the invention, since the latch is engageable and disengageable and openable and closeable using only hand motion, a craftsperson does not need tools to either open or close the pressure clamp, and an amount of pressure generated on a closure seal by the pressure clamp is totally independent of an installation practice of any given craftsperson thus ensuring that an optimum seal is always provided for a telecommunications closure. Though the pressure clamp has been described by reference to a closure in an above ground pedestal, it should be readily apparent the closure and pressure seal can be disposed in underground or aerial environments.

Though the invention has been described by reference to certain preferred embodiments thereof, it should be apparent to those of ordinary skill in the art that various modifications and variations thereto are readily possible and all such modifications and variations are intended to be included within the scope of the invention, the invention being limited only by the appended claims.

What is claimed is:

1. A pressure clamp (21) for a telecommunications closure (1), comprising:

a circumferential clamp member (22, 23) which encircles a sealing ring (25) disposed within a circumferential cavity (26) formed between mating parts (47, 48) of the telecommunications closure, the clamp member having first and second confronting ends (31, 32) which are separated in an unclamped state from one another, the clamp member having first and second legs (27, 28) extending radially inwardly around its circumference, an interior surface (29, 30) of the legs being shaped so as to be slideable over radially extending mating engagement surfaces (49, 50) of the closure parts;

means (24) for urging and latching the first and second confronting ends together so as to urge the clamp member legs over the engagement surfaces to maintain compression on the sealing ring to provide a pressure seal between the closure mating parts;

the urging and latching means including an over-center rotatable latch (38) rotatably moveable between a first open unlatched position and a second latched position, an attractive force exerted between the first and second clamp member confronting ends increasing to a maximum as the rotatable latch is moved from its first position to an intermediate position between the first and second positions and then decreasing from the maximum as the latch is moved from the intermediate position to the second position.

2. The clamp of claim 1, the urging and latching means further including a rod (39) having a first end (40) rotatably connected to the first clamp member confronting end and having a second end (41) rotatably connected to the latch, an end (42) of the latch being in pressure contact with an outer side surface (43) of the second clamp member when the latch is in its second position.

3. The clamp of claim 2, each clamp member confronting end being U-shaped so as to form a longitudinal channel (33), the rod being rotatably moveable within the channel and extending through the channel when the latch is in its second position.

4. The clamp of claim 3, further comprising first and second pins (55, 56) for rotatably connecting the rod to the first clamp member confronting end, and the latch to the rod, respectively.

5. The clamp of claim 4, the rod including a first hole (54) which is axially aligned with a second hole (59) in the second clamp member end when the latch is in its second position, and further comprising a locking pin disposed through the first and second holes to further maintain the latch in its second position.

6. The clamp of claim 1, each mating engaging surface forming a small angle with a plane which is substantially parallel to a diameter connecting opposite ends of the sealing ring, the mating engaging surfaces extending so as to diverge from one another as they extend radially inwardly, the interior surfaces of the first and second legs being angled and shaped so as to be complementary in shape to those of the mating engaging surfaces such that upon movement of the legs radially inwardly over the mating engaging surfaces forces substantially parallel to a normal of the plane are generated to thereby urge the closure parts together and compress the sealing ring within the circumferential cavity.

7. The clamp of claim 6, the angle being between 4° and 16°.

8. The clamp of claim 1, further comprising a pin (58), the circumferential clamp member including first and second semicircular shaped members substantially identical in construction to one another, the semicircular shaped members being rotatably connected at ends thereof opposite their confronting ends by the pin.

9. The clamp of claim 1, the circumferential clamp members and the mating parts of the telecommunications closure being made of a non-metallic plastic material.

10. The clamp of claim 1, the telecommunications closure including a card cage (51) therein with a plurality of cards (67) having electrical circuits (68) thereon disposed within the card cage.

11. A telecommunications closure (1), comprising:
a closure base plate (48);
a closure dome (47) mateable with the base plate;
a sealing ring (25);
a card cage (51) disposed within the dome and connected to the base plate, the card cage including a plurality of circuit boards (67) therein having electrical circuits (68) thereon;
a pressure clamp (21) for sealingly connecting the dome to the base plate, the clamp including:
a circumferential clamp member (22, 23) which encircles the sealing ring disposed within a circumferential cavity (26) formed between the base plate and the dome, the clamp member having first and second confronting ends (31, 32) which are separated in an unclamped state from one another, the clamp member having first and second legs (27, 28) extending radially inwardly around its circumference, an interior surface (29, 30) of the legs being shaped so as to be slideable over radially extending mating engagement surfaces (49, 50) of the closure parts;
means (24) for urging and latching the first and second confronting ends together so as to urge the clamp member legs over the engagement surfaces to maintain compression on the sealing ring to provide a pressure seal between the closure mating parts;
the urging and latching means including an over-center rotatable latch (38) rotatably moveable between a first open unlatched position and a second latched position, an attractive force exerted between the first and second clamp member confronting ends increasing to a maximum as the rotatable latch is moved from its first position to an intermediate position between the first and second positions and then decreasing from the maximum as the latch is moved from the intermediate position to the second position.

12. A pressure clamp (21) for a telecommunications closure (1), comprising:
a circumferential clamp member (22, 23) which encircles a sealing ring (25) disposed within a circumferential cavity (26) formed between mating parts (47, 48) of the telecommunications closure, the clamp member having first and second confronting ends (31, 32) which are separated in an unclamped state from one another, the clamp member having first and second legs (27, 28) extending radially inwardly around its circumference, an interior surface (29, 30) of the legs being shaped so as to be slideable over radially extending mating engagement surfaces (49, 50) of the closure parts, the interior surfaces of the legs and the mating engagement surfaces of the closure parts being angled so as to form an angle less than 14° with a plane which is substantially parallel to a diameter connecting opposite ends of the sealing ring;
means (24) for urging and latching the first and second confronting ends together so as to urge the clamp member legs over the engagement surfaces to maintain compression on the sealing ring to provide a pressure seal between the closure mating parts.

* * * * *